Sept. 18, 1951

L. J. ANDERSON

MAGAZINE-TYPE MAGNETIC PHONOGRAPH
HAVING A FAST REWIND MECHANISM

Filed May 28, 1949

2,568,601

Inventor
LESLIE J. ANDERSON

By Morris L. Rabkin

Attorney

Patented Sept. 18, 1951

2,568,601

UNITED STATES PATENT OFFICE 2,568,601

MAGAZINE-TYPE MAGNETIC PHONOGRAPH HAVING A FAST REWIND MECHANISM

Leslie J. Anderson, Moorestown, N. J., assignor to Radio Corporation of America, a corporation of Delaware Application May 28, 1949, Serial No. 95,973

5 Claims. (Cl. 274—4)

This invention relates to improvements in magnetic sound recording and reproducing apparatus of the kind employing reelable magnetic records and wherein each record, or a number of them, and the driven portion of the reeling system therefor, are permanently mounted in a magazine whereby to facilitate changing records by eliminating the necessity of manually threading a record in the machine prior to a recording or reproducing interval. Considered from one aspect, the present invention comprises an improvement upon the magazine type phonograph described in copending application of Terry M. Shrader, Serial No. 628,295, filed November 13, 1945 (now U. S. Patent No. 2,557,012).

The principal object of the present invention is to provide an improved magazine-type magnetic phonograph and one which shall incorporate a simple, inexpensive and trouble-free, fast-rewind mechanism.

Another and specific object of the invention is to provide a magazine-type magnetic phonograph employing a single-speed reeling motor and a fast rewind mechanism operated by said motor, and one wherein fast rewinding is initiated simply by inverting the magazine and inserting it, "upside-down" in the machine.

Stated generally, the foregoing and related objects are achieved in accordance with the invention by arranging the driven element of the reeling system for the record off the center line of the magazine so that the magazine may be entered into the socket of the machine with said driven element on either side of the center line of the socket, and by providing driving elements of different speed ratios within the socket on opposite sides of its center in a position selectively to engage said driven element as determined by the position (i. e., "right-side-up" or "up-side-down"), in which the magazine is inserted within the socket. In the illustrated preferred embodiment of the invention, the socket assembly is such that the record is maintained out of normal playing engagement with its sound-head during the fast rewinding interval.

The invention is described in greater detail in connection with the accompanying drawing, wherein.

Figure 1:
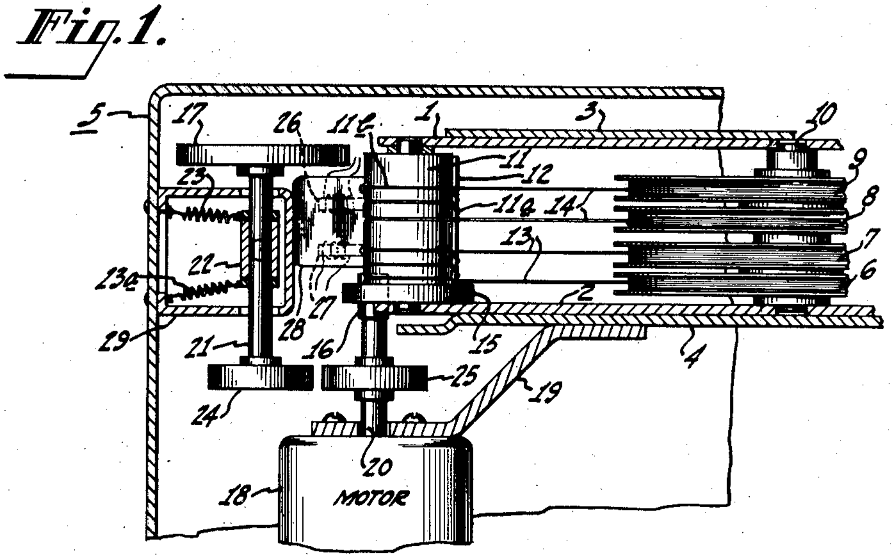
Fig. 1 is a side elevation, partly in section, of a magazine type magnetic phonograph, constructed in accordance with the invention, and shown with the magazine in its normal playing position in the socket of the machine.
Figure 2:
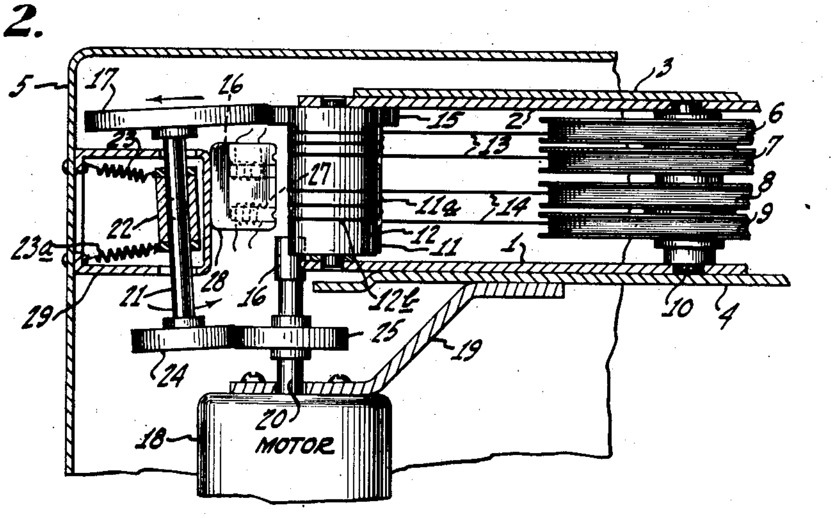
Fig. 2 is a view similar to Fig. 1 but showing the magazine in its inverted "fast-rewind" position.

In the embodiment of the invention which has been selected for illustration, 1 and 2 designate, respectively, the "top" and "bottom" surfaces of a box-like metal casing of a record magazine similar to one shown in the above-identified Shrader patent, and reference numerals 3 and 4 designate the inner "top" and "bottom" walls of a socket in a cabinet 5, within which the magazine is removably inserted. Here, as in the Shrader patent, the magazine contains a plural-wire reeling system comprising four reels, 6 to 9 inclusive, mounted for independent rotation in either direction about a common axis or shaft 10, and two rollers 11 and 12 mounted in spaced-apart parallel relation adjacent to the open or leading end of the casing. Each of the two magnetic wire records 13 and 14 is wound to run around and between the spaced apart rollers 11 and 12 in its journey between its storage reel (6 or 8) and its take-up reel (7 or 9). The rollers 11 and 12 are provided with parallel grooves 11*a*, 12*b*, etc., within certain ones of which the wires are received. One of the rollers (in this case the one designated 11) is provided, adjacent to one of its ends, with a driven element in the form of a circular flange 15 to which discrete driving forces may be selectively applied, through separate rotatable driving elements 16 and 17 which are mounted, in a manner later described, near the inner extremities of the oppositely located surfaces 3 and 4 of the socket. It will be observed that both the casing 1–2 and the socket 3–4 are symmetrical and, since the driven element 15 is mounted off the (horizontal) axis of symmetry, the magazine may be inserted within the socket either "right-side-up" (as shown in Fig. 1) or "up-side-down" (as shown in Fig. 2). Thus, when the magazine is inserted "right-side-up," its driven element 15 engages the driving element 16 of smaller diameter adjacent to the bottom surface of the socket; and when inserted "up-side-down," it engages the driving element 17 of larger diameter adjacent to the top surface 3 of the socket.

A prime mover in the form of a reversible, constant-speed, electric motor 18 is mounted within the cabinet 5 as on a bracket 19. The smaller one 16 of the driving elements 16—17 is secured to the free end of the shaft 20 of the motor 18 in a position to be engaged directly by the driven element 15 when the magazine is inserted "right-side-up" in the socket, as shown in Fig. 1. The other driving element 17 is secured to the upper end of an idler shaft 21 which is mounted for tiltable movement on a pivot 22 beyond the inner extremity of the socket. This shaft 21 is normally biased, as by springs 23, 23a, to a position parallel to the axes of the rollers 11 and 12 and of the motor shaft 20 so that, as shown in Fig. 1, the driving element 17 is idle and out of contact with any part of the reel-driving mechanism when the magazine is right-side-up in its socket. The opposite or lower end of the idler shaft 21 has a clutch element in the form of a wheel 24 affixed thereto in a position to be engaged and driven (see Fig. 2) by an auxiliary wheel 25 on the motor shaft 20 when the idler shaft 21 is tilted by the force applied to the driving element 17 through the driven element 15 when the magazine is pushed into the socket upside-down. It will be apparent upon inspection of the drawing that the relative dimensions and the arrangement of the driving wheels 25, 24 and 17 are such that they serve to drive the driven element 15 of the reeling system at a higher speed than the smaller driving element 16, the direction of reeling being determined in each case by the direction of rotation of the reversible motor 18. Thus, if the constant speed of the motor 18 is such as to drive the reeling system for the records 13 and 14 at their normal playing speed when the driven element 15 is coupled directly to the driving element 16, the said records will be driven at a higher speed in the opposite or reeling direction when the motor is reversed and the driving force is applied to the driven element 15 by the driving element 17 through the "clutch mechanism" 24—25.

One or more magnetic transducers or "sound-heads" 26 and 27 are provided for each of the wire records 13 and 14. The sound-heads are shown embedded in a block of insulating material 28, and it will be understood that their pole pieces lie flush with the exposed front edge of the block. The lead wires for the coils of the sound-heads will be understood to be connected, as in the Shrader patent, through a suitable switch (not shown) to appropriate input and output devices.

As shown in Fig. 1, the dimensions and positions of the block 28 and its support 29 are such that when the magazine is pushed all the way into its socket, right-side-up, those portions of the wire 13 and 14 which extend across the space between the rollers 11 and 12 will bear against the exposed air-gap or terminal portions of the sound-heads 26 and 27, respectively. Thus, when the motor 20 is turned on, the records 13 and 14 are driven (by the force supplied by the driving element 16) past the transducers, so that the energized transducer will be magnetically coupled to the record which it is designed to serve.

It will be observed upon inspection of Fig. 2 that when the cartridge is pushed into its socket upside-down, the driven element 15 of the cartridge encounters the large driving element 17 in the socket and prevents the wires 13 and 14 from being brought into frictional contact with the transducer block 28 during the fast rewinding interval. This not only reduces friction and wear, but also reduces (or silences) the recorded sounds during the rewinding operation.

It will now be apparent that the present invention provides an improved magazine-type magnetic phonograph and one having a simple, inexpensive and trouble-free, fast-rewind mechanism.

What is claimed is:

1. In a magnetic phonograph of the magazine type, a cabinet having a socket for the reception of a magazine, said magazine comprising a casing containing (a) a reelable magnetic record, (b) a reeling system for said record and (c) a driven element through which a driving force may be applied in either direction to said record through said reeling system, said casing being provided adjacent to its leading end with an opening and said driven element being mounted adjacent to said opening off the center line of said casing, said casing and said socket being symmetrical whereby said casing may be entered into said socket with said driven element on either side of the center of said socket, and rotatable driving elements mounted in said socket on opposite sides of its center in a position selectively to engage said driven element as determined by the position in which said casing is inserted within said socket.

2. The invention as set forth in claim 1 and wherein means are provided for rotatably driving the engaged one of said driving elements in a direction determined by the direction of rotation of said means.

3. The invention as set forth in claim 2 and wherein said rotatable driving means comprises a prime mover to which one of said driving elements is directly coupled, and a clutch mechanism including an idler pulley permanently connected to the other of said driving elements and mounted for movement into and out of torque-transfer relation with respect to said prime mover in response to the engagement of said driven element with said other of said driving elements.

4. The invention as set forth in claim 3 and wherein said directly coupled and indirectly coupled driving elements are of different effective diameters and serve to drive said driven element at different speeds.

5. The invention as set forth in claim 1 and wherein said socket contains a magnetic sound-head mounted in register with a portion of the path of said reelable magnetic record and against which said record is adapted to bear when said magazine is inserted in said socket in a certain one of the said positions, and wherein means are provided within said socket for maintaining said magnetic sound-head out of contact with said record when said magazine is inserted in said socket in the other of said positions.

LESLIE J. ANDERSON.

No references cited.